United States Patent [19]

Kobayashi et al.

[11] Patent Number: 4,965,478
[45] Date of Patent: Oct. 23, 1990

[54] DC MOTOR WITH A DURABLE PIGTAIL ARRANGEMENT

[75] Inventors: Kouji Kobayashi, Nitta; Hideyuki Minami, Kiryu; Shinichi Nagashima, Ashikaga, all of Japan

[73] Assignee: Mitsuba Electric Mfg. Co., Ltd., Gumma, Japan

[21] Appl. No.: 385,245

[22] Filed: Jul. 25, 1989

[30] Foreign Application Priority Data

Sep. 2, 1988 [JP] Japan .................. 63-115639[U]
Sep. 5, 1988 [JP] Japan .................. 63-116562[U]
Sep. 5, 1988 [JP] Japan .................. 63-116563[U]
Sep. 20, 1988 [JP] Japan .................. 63-123193[U]

[51] Int. Cl.⁵ .................. H01R 13/52; H02K 5/22; H02K 5/24
[52] U.S. Cl. .................. 310/249; 174/135; 174/153 G; 310/71; 439/455
[58] Field of Search .................. 174/65 G, 135, 151 G, 174/153 G; 310/40 MM, 71, 88, 89, 239, 242, 245, 246, 249; 439/449, 455, 459, 460, 470

[56] References Cited

U.S. PATENT DOCUMENTS 2,276,818  3/1942  Bellows, Jr. .................. 439/460
2,717,792  9/1955  Pelley .................. 174/152 G
4,355,253 10/1982  Vollbrecht .................. 310/239
4,407,042 10/1983  Schramme et al. .................. 174/153 G
4,413,200 11/1983  Fenicle .
4,585,968  4/1986  Cambrodon .................. 310/239
4,678,146  7/1987  Plyler .................. 174/65 E
4,678,867  7/1987  Bongard et al. .................. 174/135

FOREIGN PATENT DOCUMENTS 0219681   9/1986  European Pat. Off. .
488796    1/1930  Fed. Rep. of Germany ... 174/152 G
6802396   9/1968  Fed.-Rep. of Germany .
2530885   1/1984  France .
58-150355 10/1983 Japan .
59-34461   3/1984 Japan .
59-66360   5/1984 Japan .
59-109288  7/1984 Japan .
59-32199   9/1984 Japan .
59-132369  9/1984 Japan .
59-189466 12/1984 Japan .
60-55274   4/1985 Japan .
60-73372   5/1985 Japan .................. 310/239
60-128469  8/1985 Japan .
2118377  11/1982 United Kingdom .

Primary Examiner—William H. Beha, Jr.
Assistant Examiner—D. L. Rebsch
Attorney, Agent, or Firm—Darby & Darby

[57] ABSTRACT

A dc motor including a first set of pigtails passing out of the motor case through a grommet which is fitted in an opening formed in the motor case. This motor has a pigtail holder which fixes the first set of pigtails to the grommet. The pigtail holder includes first and second portions. The first portion is stationarily engaged with the grommet, while the second portion is fixedly connected to those portions of the first set of pigtails inside the motor case. With this fixed pigtail arrangement, movement of the first set of pigtails is restrained, and therefore, effects of vibration on the first set of pigtails are reduced when the motor is subjected to vibration.

11 Claims, 4 Drawing Sheets

DC MOTOR WITH A DURABLE PIGTAIL ARRANGEMENT

BACKGROUND OF THE INVENTION

This invention relates to a multipolar dc motor having an improved pigtail arrangement, and more specifically, to brush pigtails specially arranged in a dc motor so as to improve durability against vibration, moisture, and the like.

Japanese Utility Model Application preliminary publication No. sho 58-150355 discloses a conventional multipolar dc motor which includes a pair of positive brushes and a pair of negative brushes. These four brushes are circumferentially disposed around a commutator at various angular intervals, and are in sliding electrical contact with the commutator. All the brushes are movably received in their respective brush holders which are mounted on an annular brush stay. The positive brushes are approximately 120 degrees apart, and then the negative brushes are about 120 degrees apart. Each of the positive brushes is diametrically opposed to a negative brush. A positive brush and the adjacent negative brush are approximately 60 degrees apart, and the other positive brush and the adjacent negative brush are about 60 degrees apart. Springs which urge the positive brush against the commutator are disposed respectively in the smaller spaces between the positive and negative brushes, while springs which urge the negative brushes are disposed in the larger space between the negative brushes. Pigtails, which are lead wires for connecting the positive brushes to a power source, extend respectively from the positive brushes, being routed into the larger space between the positive brushes, and pass out of the motor case through an insulating member called "grommet" which engages with the motor case.

In the conventional dc motor mentioned above, however, the pigtails are not fixed to any part of the motor but are only loosely restrained by the grommet. Therefore, if the motor is installed in an automotive vehicle, for example, and thus is subjected to vibration, particular portions of the pigtails, such as those portions adjacent to the grommet, undergo repeated stresses. This often results in the disconnection of the pigtails in an unexpectantly short period.

Furthermore, although the aforementioned Japanese publication discloses a proper wiring arrangement, utilizing the larger space, for the pigtails of the positive brushes, it discloses no wiring arrangement for the pigtails connected to the negative brushes. Should these negative pigtails be extended into the smaller spaces, they can easily contact the springs for the positive brushes, causing a shortcircuit. On the other hand, if the negative pigtails pass out of the motor case through the larger space between the negative brushes, these pigtails must be lengthened and routed around the springs for the negative brushes to avoid interference with the springs. Such lengthened pigtails, however, tend not only to interfere with the movement of the negative brushes, but also tend to rub against the springs due to the vibration. These tendencies will decrease the reliability and durability of the motor.

Moreover, since each of the pigtails is formed of many filament wires twisted or braided together, a problem can arise due to capillary action, when a liquid such as rain water and oil is wicked into the motor case through the pigtails which pass out of the motor case therethrough. When the brushes are wet due to such rain water or oil, the abrasion of the brushes will be accelerated.

Lastly, in conventional motors, the positioning of the brush stay relative to the rear bracket of the motor case is not taken into account. The brush stay must be accurately positioned on the rear bracket to mount the stay on the bracket by means of machine screws. However, it is difficult in the conventional motors to align the axes of the threaded holes of the stay respectively with those of the through-holes of the bracket. That difficulty has lowered workability during the assembly of the motors.

SUMMARY OF THE INVENTION

Accordingly it is an object of the present invention to provide a dc motor in which pigtails passing through the motor case are stably held in the motor case so as to reduce the effects of vibration.

Another object of the present invention is to provide a dc motor in which the wicking of liquid into the motor case, due to capillary action, is definitely prevented;

A further object of the present invention is to provide a dc motor, in the assembling of which, the positioning of the brush stay onto the rear bracket is easy;

A still further object of the present invention is to provide a dc motor in which pigtails for the negative brushes are appropriately arranged in order to increase reliability and service life.

In view of these and other objects, the present invention provides a dc motor including a first set of pigtails passing out of the motor case through the grommet. This motor has a securing means which fixes the first set of pigtails to the grommet. The securing means includes first and second means. The first means is stationarily engaged with the grommet, while the second means is fixedly connected to those portions of the first set of pigtails inside the motor case. With this fixed pigtail arrangement, movement of the first set of pigtails is restricted, and therefore, effects of vibration on the first set of pigtails are reduced when the motor is subjected to vibration.

It is preferred that the first set pigtails have respective sealing sections for preventing wicking of liquid by capillary action into the motor case through the first set of pigtails. These sealing sections are formed at those portion of the first set of pigtails outside the motor case. The sealing sections reduce abrasion of the brushes. Each of the sealing sections may be formed by bonding its constituent filament wires together by using a material such as a welding metal, a brazing metal, or a synthetic adhesive resin.

It is also preferred that the grommet is engaged with the rear bracket, and the brush stay has an engaging portion engaging with the grommet. In this case, the location of the engaging portion on the brush stay should be such that, when the engaging portion is engaged with the grommet, the brush stay is properly positioned on the rear bracket to be fastened to the rear bracket. In other words, by engaging the engaging portion of the brush stay with the grommet, the brush stay can be properly positioned on the rear bracket. This arrangement facilitates the fastening of the brush stay to the rear bracket, and thus enhances workability during assembly.

When the motor includes a second set of pigtails which does not lead outside the motor case, it is also preferred that the angular interval is more than 90° between two brushes of the same polarity to which two pigtails of the second set are connected. In this case, the two brushes may be adjacent to each other without any brush interposed therebetween, and the brush stay may have a grounded terminal member projecting generally parallel to the axis of the commutator from that portion of the inner peripheral edge of the annular brush stay between the two brushes. The two pigtails of the second set are routed into the space between the two brushes and are electrically connected at their end portions to the terminal member. With this pigtail arrangement, the spaces among the brushes are efficiently utilized, and also interference of the pigtails with other parts on the brush stay is avoided.

DETAILED DESCRIPTION OF THE PREFERRED EMBODIMENT

Figure 1:
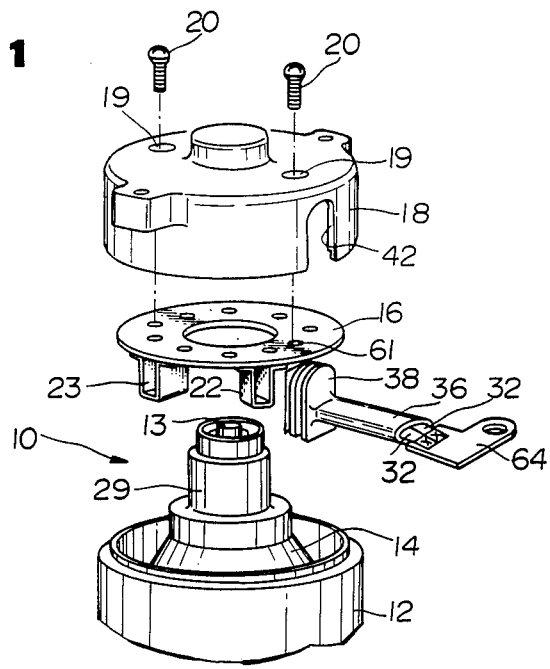
FIG. 1 is an exploded fragmentary simplified perspective view of a dc motor according to the present invention.
Figure 2:
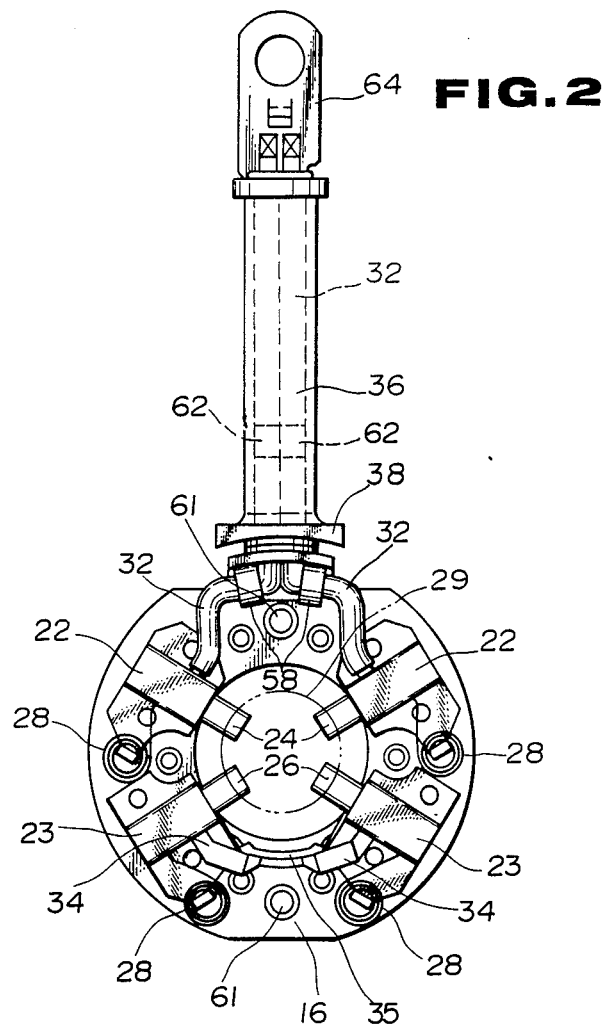
FIG. 2 is a plan view of a brush stay of the motor in FIG. 1, showing brushes, springs, pigtails and the like mounted on the stay.

Referring to FIG. 1, reference numeral 10 denotes a six-pole dc motor according to the present invention. Magnets (not shown) are disposed on the inner peripheral surface of a cylindrical yoke 12 which is a part of a motor case of the motor 10. An armature 14 is disposed within the yoke 12, and the shaft 13 of the armature 14 is rotatably supported by opposite end brackets (only a rear bracket 18 is shown) of the motor case. An annular brush stay 16 is mounted on the inner face of the rear bracket 18 by means of screws 20 so as to be disposed around the end portion of the armature shaft 13. The brush stay 16 is formed of an annular metal plate to which an annular insulating plate is attached. On the insulating plate side (the lower side as viewed in FIG. 1) of the stay 16, are mounted four brush holders 22, 22, 23 and 23. Each of the brush holders 22, 22, 23 and 23 is made of a metal plate formed into a gutter-like configuration having a rectangular cross section, and has one or two cutouts formed in its side walls, as will be described later on. These brush holders 22, 22, 23 and 23, as shown in FIG. 2, are circumferentially arranged at angular intervals on the annular brush stay 16 to surround a commutator 29 which fixedly fits around the end portion of the armature shaft 13. The brush stay 16 and the inner face of each brush holder define a space, extending along a radial direction of the commutator 29, for receiving a carbon brush 24 or 26. More specifically, two of the brush holders 22 and 22 receive a pair of positive brushes 24 and 24, respectively, for the radial movement of the positive brushes 24 and 24, while the other two brush holders 23 and 23 receive a pair of negative brushes 26 and 26, respectively, for their radial movement. The positive brushes 24 and 24 are diametrically opposed to the negative brushes 26 and 26, respectively. The angular interval between the brush holders 22 and 22 for the positive brushes 24 and 24, that is, the angular interval between the positive brushes 24 and 24, is equal to that between the negative brushes 26 and 26, and is more than 90°, and preferably around 120°; the angular interval between each positive brush 24 and the adjacent negative brush 26 is less than 90°, and preferably 60°. These brushes 24, 24, 26 and 26 are in sliding electrical contact with the commutator 29. As will be described more specifically later on, the positive brushes 24 and 24 are connected to a power source (not shown), and the negative brushes 26 and 26 are grounded via the motor case.

Referring further to FIG. 2, four spiral springs 28 are mounted on the brush stay 16 to urge the brushes 24, 24, 26 and 26 against the peripheral face of the commutator 29. Two of the springs 28 and 28, for urging the positive brushes 24 and 24, are disposed respectively in the smaller spaces between the positive and negative brushes 24 and 26 while the other two springs 28 and 28, for urging the negative brushes 26 and 26, are disposed in the larger space between the negative brushes 26 and 26. All these spiral springs 28 are fixed at their central ends to the brush stay 16, and are in contact at their outer ends respectively with the outer ends of the brushes, which are opposite to the ends of the brushes contacting the commutator 29.

Figure 4:
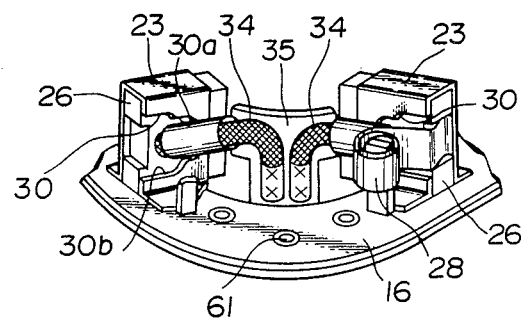
FIG. 4 is a fragmentary perspective view, one of the springs omitted, of the brush stay in FIG. 2, showing negative brushes electrically connected to the brush stay by means of the pigtails.
Figure 5:
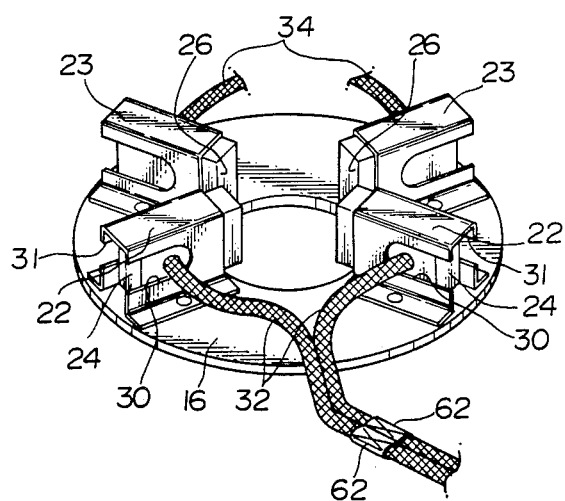
FIG. 5 is a perspective view of the brush stay with some parts omitted.
Figure 7:
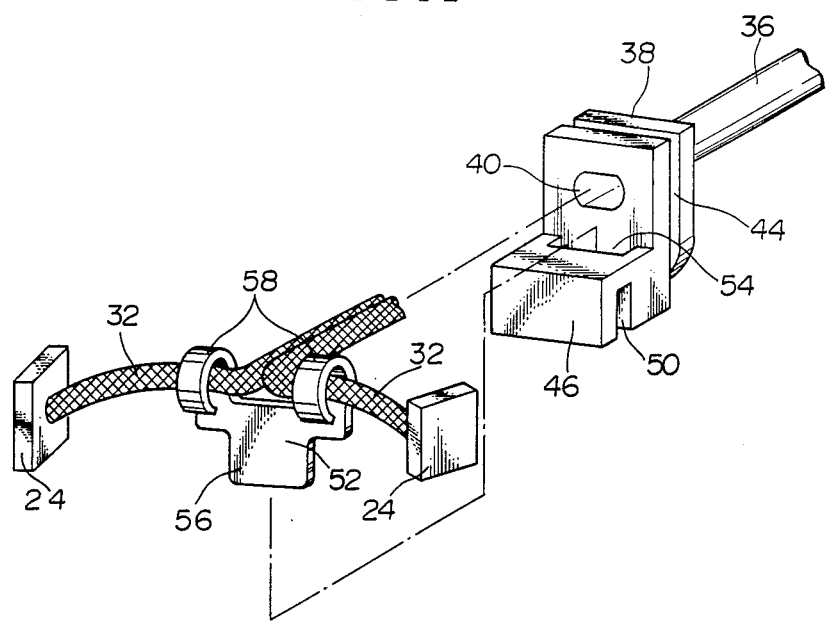
FIG. 7 is an exploded fragmentary perspective view of the brush, the pigtail, the grommet, a pigtail holder.

As shown in FIGS. 4 and 5, the brush holders 22, 22, 23 and 23 have radially extending first cutouts 30, respectively. The first cutouts 30 and 30 of the brush holders 22 and 22, as shown in FIG. 5, are formed in respective side walls of the brush holders 22 and 22, circumferentially opposing each other. The first cutouts 30 and 30 of the brush holders 23 and 23, as shown in FIG. 4, are formed in respective side walls of the brush holders 23 and 23, circumferentially opposing each other. These first cutouts 30 expose parts of the internal brushes 24, 24, 26 and 26 to the outside. To these exposed parts of the brushes 24, 24, 26 and 26, pigtails 32, 32, 34 and 34 are connected, respectively. More specifically, the ends of the pigtails 32, 32, 34 and 34 are embedded in and fixed to the exposed parts of the brushes 24, 24, 26 and 26. These pigtails 32, 32, 34 and 34 are lead wires, each being formed of many electrically conductive filament wires twisted or braided together, and are adapted to connect the brushes 24, 24, 26 and 26 to the stationary positive terminal (not shown) of a power source or a grounded part such as the motor case. The pigtails 32 and 32 which are connected to the positive brushes 24 and 24 are routed into the larger space between the positive brushes 24 and 24. Then, the pigtails 32 and 32, as shown in FIG. 7, pass out of the motor case through an insulating member in the form of a grommet 38 which is designed to fit in an opening 42 (see FIG. 1) formed in the motor case. The other two pigtails 34 and 34 which extend from the negative brushes 26 and 26, as shown in FIG. 4, are routed into the larger space between the negative brushes 26 and 26, and are connected at their end portion, by means of welding, to a T-shaped plate-like terminal fillet 35 which projects from that portion of the inner periphery of the brush stay 16 between the negative brushes 26 and 26. The terminal fillet 35 is a part of the brush stay's metal plate folded at a right angle to the brush stay 16. That is to say, the pigtails 34 and 34 are grounded through the brush stay 16 and the motor case. The terminal fillet 35 includes a proximal portion and a wing portion. The proximal portion of the terminal fillet 35 extends axially from the brush stay 16, while the wing portion of the terminal fillet 35 extends circumferentially from the proximal portion toward both the negative brushes 26 and 26. Each of the proximal and wing portions has inner and outer surfaces, the inner surface facing the commutator, the outer surface being opposite to the inner surface. More specifically, the pigtails 34 and 34 extend generally circumferentially from the respective negative brushes 26 and 26, and are laid or rest on the outer surface of the wing portion of the terminal fillet 35. Then, the end portions of the pigtails 34 and 34 are bent to the brush stay 16 and welded to the outer surface of the proximal portion of the terminal fillet 35. That is, these end portions of the pigtails 34 and 34 are disposed generally perpendicularly to the brush stay 16 or generally parallel to the axis of the commutator 29. With this pigtail arrangement, it is not necessary to route the pigtails 34 and 34 in a radial direction to lead them to the outside of the motor case, and thus it is also not necessary to lengthen the pigtails 34 and 34 to avoid their interference with the springs 28 and 28 in the smaller space between the negative brushes 26 and 26. Accordingly, the lengths of the pigtails 34 and 34 can be minimized to restrain the vibration of pigtails 34 and 34 caused, for example, by the movement of an automotive vehicle in which the motor is installed.

Figure 6:
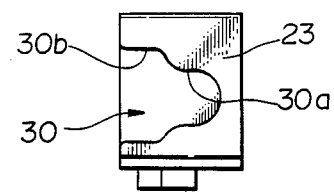
FIG. 6 is a side-elevational view of a brush holder.

As further shown in FIGS. 4 and 6, each of the first cutouts 30 and 30 of the brush holder 23 and 23 has a radially inner section 30a of a smaller width and a radially outer section 30b of a larger width. The cutouts 30 and 30 are so formed that the pigtails 34 and 34 pass out of the brush holders 23 and 23 through the inner sections 30a and 30a of the cutouts 30 and 30, and the outer ends of the springs 28 and 28 for the negative brushes 26 and 26 extend into the brush holders 23 and 23 through the outer sections 30b and 30b of the cutouts 30 and 30. Needless to say, the pigtails 32, 32, 34 and 34 and the outer ends of the springs 28 and 28 are radially movable within the cutouts 30 so as to follow the movement of the brushes 24, 24, 26 and 26.

Figure 3:
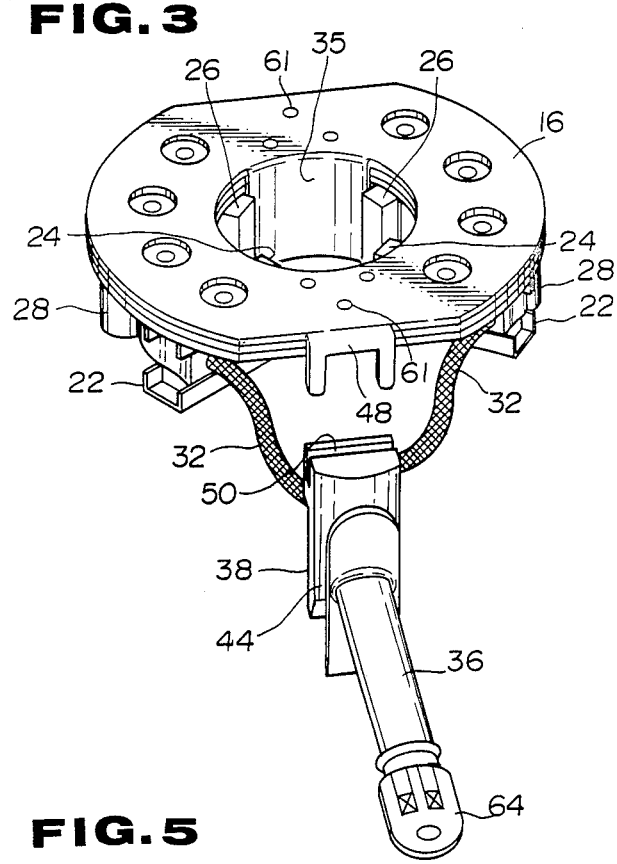
FIG. 3 is a perspective view of the brush stay in FIG. 2, showing a grommet disengaged from the brush stay.

Returning to FIG. 5, the brush holders 22 and 22 further have radially extending second cutouts 31, respectively. These second cutouts 31 and 31 are formed in respective side walls of the brush holders 22 and 22, opposite to the side walls in which the first cutouts 30 and 30 are formed. These second cutouts 31 and 31 expose parts of the positive brushes 24 and 24 to the outside. As shown in FIG. 3, the outer ends of the springs 28 and 28 for the positive brushes 24 and 24 extend into the brush holders 22 and 22 through the second cutouts 31 and 31 to contact the outer ends of the brushes 24 and 24. These outer ends of the springs 28 and 28 are radially movable within the cutouts 31 and 31 so as to follow the movement of the brushes 24 and 24.

Referring to FIGS. 2, 3 and 7, the grommet 38 has inner and outer faces and a peripheral face, wherein the inner face is opposed to the brushes 22 and 22 and the like, and wherein the outer face is exposed to the external atmosphere. This grommet 38 is integrally formed with a tubular member 36 which is joined at its inner end to the outer face of the grommet 38. The grommet 38, as well as the tubular member 36, is made of a flexible insulating material such as rubber, synthetic resin and the like, and encloses the pigtails 32 and 32, i.e., those portions of the pigtails 32 and 32 outside the motor case, so as to serve as an insulating and waterproof sheath. The reference numeral 40 designates a through-hole formed in the grommet 38 and communicating with the internal space of tubular member 36. The grommet 38 has a first groove 44 peripherally extending completely along the peripheral face thereof, while the rear bracket 18 of the motor case, as shown in FIG. 1, has an opening in the form of a cutout 42 for allowing the pigtails 32 and 32 to pass therethrough. That portion of the rear bracket 18 defining the cutout 42 fits in the first groove 44 of the grommet 38 so that the grommet 38 is engaged with the rear bracket 18, and prevents rain water and dust from coming into the motor case through the cutout 42.

As best shown in FIGS. 3 and 7, the grommet 38 further has a rectangular projection 46 extending from that section of the inner face of the grommet 38 beside the through-hole 40. This projection 46 has a second groove 50 and a pocket 54. The second groove 50 extends peripherally along the lower and the opposite side faces, as viewed in FIG. 7, of the projection 46, while the pocket 54 is formed in the upper face of the projection 46 and extends generally parallel to the axis of the commutator 29. The second groove 50 fittingly receives a U-shaped engaging fillet 48 (see FIG. 3) which extends perpendicularly from the outer periphery of the brush stay 16. This engaging fillet 48 is formed of a part of the brush stay bent at a right angle toward the yoke 12. By this engagement between the second groove 50 and the fillet 48, the radial movement of the grommet 38 relative to the brush stay 16, as well as its circumferential movement, is restricted. The pocket 54 fittingly receives a securing means in the form of a pigtail-holder 52 which is a generally U-shaped metal plate piece with a tail 56 and a pair of tabs 58 and 58. More specifically, the tail 56 is a portion for fitting into the pocket 54, and the nails 58 and 58 are portions for holding those portions of the pigtails 32 and 32 inside the motor case. The holder 52 is made of steel, for example, which can be easily subjected to plastic, deformation. As shown in FIG. 7, the tabs 58 and 58 of the holder 52 are bent to firmly grasp the pigtails 32 and 32, respectively. Accordingly, the pigtails 32 and 32 are fixed to the grommet 38 by means of the holder 52 so that radial movement, as well as axial movement, of those portions of the the pigtails 32 and 32 inside the motor case is restrained. In order to prevent wear on those portions of the pigtails 32 and 32 grasped by the holder 52, and in order to electrically insulate the pigtails 32 and 32 from the holder 52, the pigtails 32 and 32 may be covered with a sheath made of a insulating material such as a glass fiber, rubber, synthetic resin, and the like.

As described above, those portions of the pigtails 32 and 32 adjacent to the through-hole 40 of the grommet 38 are fixed to the grommet 38. Therefore, the lengths of the pigtails 32 and 32 between the holder 52 and the respective positive brushes 24 and 24 are maintained constant. Even if an external force that may loosen the pigtails 32 and 32 is applied to the pigtails 32 and 32, this loosening force is obstructed by the holder, and thus does not result in the loosening of the pigtails 32 and 32 inside the motor case. Therefore, it is possible to lengthen those portions of the pigtails 32 and 32 between the holder 52 and the brushes 24 to the maximal lengths to enhance workability during wiring assembly. Moreover, under operating conditions subject to severe vibration, the pigtails 32 and 32 do not move around to any significant degree and thus cause no contact with other metal portions and no short-circuits.

Figure 8:
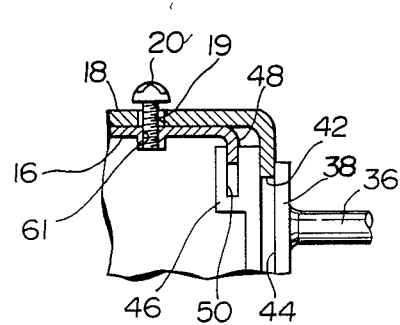
FIG. 8 is a fragmentary axial-sectional view of the motor in FIG. 1, showing the manner in which the grommet helps the positioning of the brush stay onto a rear bracket, and the manner in which the brush stay is fastened to the rear bracket.

Referring to FIGS. 1 and 8. the brush stay 16 is fastened to the inner face of the rear bracket 18 by means of screws 20 and 20. That portion of the rear bracket 18 defining the cutout 42 fits in the first groove 44 of the grommet 38, while the engaging fillet 48 of the brush stay 16 fits in the second groove 50 of the grommet 38. The rear bracket 18 and the brush stay 16 are, thus, unitarily assembled. The grommet 38 is fixedly clamped between the rear bracket 18 and the yoke 12 so that the pigtails 32 are appropriately positioned relative to the motor case. In order to assemble the motor 10 mentioned above, the grommet 38 with the pigtail 32 passing therethrough, is mounted on the brush stay 16 by inserting the engaging fillet 48 into the second groove 50 of the grommet 38. Then, the brush stay 16 with the grommet 38 and the brushes 24, 24, 26 and 26 is disposed around the commutator 29. After that, the rear bracket 18 is placed onto the corresponding end of the yoke 12 to cover the brush stay 16, and at the same time, that portion of the rear bracket 18 defining the cutout 42 is fitted in the first groove 44 of the grommet 38 so that the rear bracket 18 is properly positioned over the brush stay 16. Lastly, the rear bracket 18 is fastened to the brush stay 16 by means of the screws 20 and 20. When the cutout-defining portion of the rear bracket 18 is fitted in the first groove 44 of the grommet 38, the axes of through-holes 19 and 19 in the rear bracket 18 are accurately aligned respectively with those of threaded holes 61 and 61 in the brush stay 16. Therefore, it is easy in this motor assembly to insert the screws 20 and 20 from the outside of the rear bracket 18 into the holes 61 and 61 which cannot be easily seen from the outside. Also, during the assembly of this motor, since the brush stay 16 is mechanically coupled with the rear bracket 18 by means of grommet 38, external force, which can damage the pigtails 32 and 32, is not unnecessarily applied to the pigtails 32 and 32.

Returning to FIGS. 2 and 5, sealing sections 62 and 62 are formed on those portions of the pigtails 32 and 32 covered by the tubular member 36. Each of the sealing sections 62 and 62 is formed by bonding the filament wires of the pigtail 32 together by means of, for example, spot welding. That is, at these sealing sections 62 and 62, welding or brazing metals close the gaps among the filament wires and prevent the wicking of water or oil due to capillary action into the motor case. In this embodiment, the sealing sections 62 and 62 of the pigtails 32 and 32 are disposed at the same distance from the grommet 38 (see FIG. 2) so as to prevent liquid from wicking through one of pigtails 32, from transferring to the other pigtail 32, and finally from coming into the motor case. Also, since the sealing sections 62 and 62 are located at similar positions on their respective pigtails 32 and 32, the pigtails 32 of the same standard can be used. This fact is advantageous in maintaining the parts of the motor. In order to form the sealing sections 62 and 62, not only a welding or brazing metal, but also a synthetic adhesive resin, may be utilized. More specifically, a part of each pigtail 32 may be impregnated with the adhesive resin to form a sealing section. By preventing the wicking of liquid through the pigtails 32 and 32, the corrosion of brushes 24 and 26 and other parts within the motor case can be greatly reduced, and therefore the durability and service life of the motor will be extended.

In addition, a terminal strip 64, as shown in FIG. 3, is welded and connected to the outer ends of the pigtails 32 and 32, located outside the grommet 38. This terminal strip 64 facilitates the assembly works for connecting the pigtails 32 and 32 to an electric source.

It should be understood that although a preferred embodiment has been shown and described, various modifications thereof will be apparent to those skilled in the art. For example, it should be readily apparent that the positions of the positive and negative brushes may be exchanged. It should be also readily apparent that the present invention may be applied to the multipolar motors having less than or more than six magnetic poles.

What is claimed is:

1. A dc motor including: a motor case having an opening for wiring; a commutator disposed in the motor case; a first set of brushes in sliding electrical contact with the commutator; a first set of pigtails, extending respectively from the first set of brushes, for electrically connecting the first set of brushes to stationary terminals, the first set of pigtails passing out of the motor case through the opening in the motor case; and an insulating member fixedly fitting in the opening of the motor case so as to fill a gap between the motor case and the first set of pigtails as well as to insulate the first set of pigtails from the motor case, wherein the improvement comprises:

securing means fixing the first set of pigtails to the insulating member, the securing means comprising: first means stationarily engaged with the insulating member; and second means fixedly connected to those portions of the first set of pigtails inside the motor case;

wherein the second means comprises a plurality of tabs firmly holding said portions of the first set of pigtails, respectively;

wherein the insulating member has inner and outer faces, the inner face facing the inside of the motor case, the outer face being exposed to the external atmosphere, wherein the insulating member further has a projection formed on its inner face, the projection being formed with a pocket extending generally parallel to the axis of the commutator, and wherein the first means comprises a tail portion unitarily formed with the tabs, the tail portion fitting in the pocket of the projection and engaging with the projection.

2. A dc motor according to claim 1, wherein each of the first set of pigtails is formed of a plurality of electrically conductive filament wires, wherein the first set of pigtails have respective block sections for preventing wicking of liquid by capillary action into the motor case through the first set of pigtails, the block sections formed at those portions of the first set of pigtails outside the motor case.

3. A dc motor according to claim 2, wherein each of the block sections is formed by bonding its constituent filament wires together by using a material selected from the group consisting of a welding metal, a brazing metal, and a synthetic adhesive resin.

4. A dc motor according to claim 3, wherein the block sections of the first set of pigtails are disposed at the same distance from the insulating member.

5. A dc motor as recited in claim 2, wherein the blocking sections are a part of melting filament wires and welding or brazing metals close the gaps among the filament wires.

6. A dc motor including: a motor case having an opening for wiring; a commutator disposed in the motor case; a first set of brushes in sliding electrical contact with the commutator; a first set of pigtails, extending respectively from the first set of brushes, for electrically connecting the first set of brushes to stationary terminals, the first set of pigtails passing out of the motor case through the opening in the motor case; and a insulating member fixedly fitting in the opening of the motor case so as to fill a gap between the motor case and the first set of pigtails as well as to insulate the first set of pigtails from the motor case, wherein the improvement comprises:
 securing means fixing the first set of pigtails to the insulating member, the securing means comprising: first means fixedly connected to those portions of the first set of pigtails inside the motor case;
 a brush stay member on which the first set of brushes are disposed, wherein the motor case includes a rear bracket in which said opening is formed, wherein the brush stay member is fastened to the rear bracket by means of screws passing through both the rear bracket and the brush stay member, and wherein the brush stay member has an engaging portion engaging with said insulating member which is fitted in the opening, the location of the engaging portion on the brush stay member is such that when the engaging portion is engaged with the insulating member, the brush stay member is properly positioned on the rear bracket to be fastened to the rear bracket.

7. A dc motor according to claim 6, wherein the insulating member has inner and outer faces, the inner face facing the inside of the motor case, the outer face being exposed to the external atmosphere, wherein the insulating member further has a projection formed on its inner face, the projection being formed with a recess extending generally parallel to the axis of the commutator, and wherein the engaging portion of the brush stay fits in the recess of the projection.

8. A dc motor according to claim 1, further including: a second set of brushes in sliding electrical contact with the commutator; an annular brush stay member on which the first and second sets of brushes are disposed, the brush stay member being disposed around the commutator; and a second set of pigtails extending respectively from the second set of brushes, the first and second set of brushes being circumferentially arranged on the brush stay member at angular intervals, wherein the angular interval between two brushes of the second set is more than 90°, said two brushes of the second set being of the same polarity and being adjacent to each other without any brush interposed therebetween, wherein the brush stay member has a grounded terminal member projecting generally parallel to the axis of the commutator from the inner peripheral edge of the annular brush stay member, the terminal member being interposed between said two brushes, wherein two pigtails of the second set, extending respectively from said two brushes of the second set, are routed into the space between said two brushes of the second set and are electrically connected at their end portions to the terminal member.

9. A dc motor according to claim 8, wherein the end portions of said two pigtails of the second set are disposed generally parallel to the axis of the commutator, and the other portions of said two pigtails ar disposed circumferentially along the inner peripheral edge of the brush stay member.

10. A dc motor according to claim 9, wherein the terminal member is a generally T-shaped metal plate comprising a proximal portion and a wing portion, the proximal portion extending axially from the brush stay member, the wing portion extending circumferentially from the proximal portion toward both said two brushes of the second set, each of the proximal and wing portions having inner and outer surfaces, the inner surface facing the commutator, the outer surface being opposite to the inner surface, and wherein the end portions of said two pigtails of the second set are attached to the outer surface of the proximal portion of the terminal member, and the other portions of said two pigtails rest on the outer surface of the wing portion.

11. A dc motor according to claim 10, further comprising a plurality of spring members mounted on the brush stay member and urging all the brushes, respectively, against the commutator, wherein the number of the first set of brushes is two, and the number of the second set of brushes is two, wherein the first set of brushes are of a polarity opposite to the polarity of the second set of brushes, and are more than 90° apart from each other, wherein two of the spring members urging the second set of brushes are interposed between the second set of brushes, and the other springs urging the first set of brushes are disposed respectively in two spaces, one of the spaces being defined between a brush of the first set and a brush of the second set, the other space being defined between the other brush of the first set and the other brush of the second set.

* * * * *